(No Model.)  2 Sheets—Sheet 1.
E. E. GOLD.
HEATING APPARATUS.
No. 309,299. Patented Dec. 16, 1884.
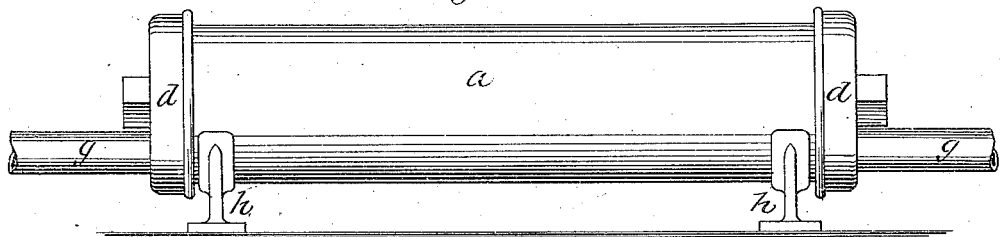
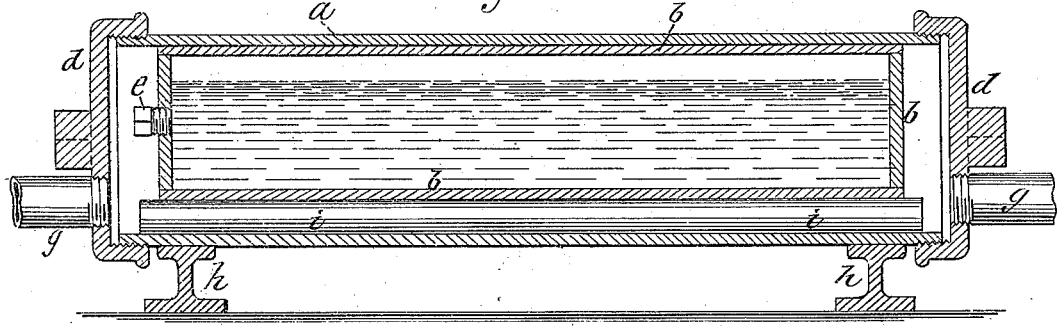
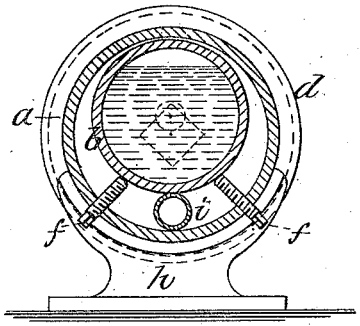
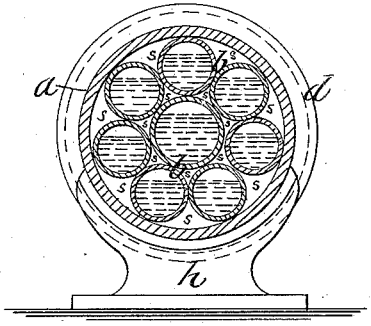
Witnesses:  Inventor:
Edward E. Gold
by Chas. M. Higgins
Attorney (No Model.)　　　　　　　　E. E. GOLD.　　　　2 Sheets—Sheet 2.
HEATING APPARATUS.
No. 309,299.　　　　　　　　　　Patented Dec. 16, 1884.
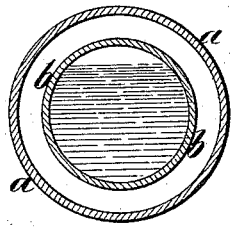
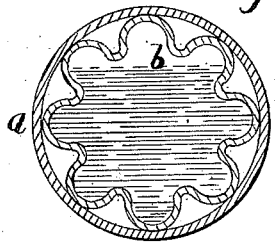 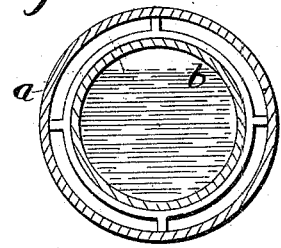
Witnesses　　　　　　　　　　　　　　　　　Inventor
John Becker　　　　　　　　　　　　　　Edward E. Gold
Jno. E. Gavin　　　　　　　　　　　　　by Chas. M. Higgins
　　　　　　　　　　　　　　　　　　　　　Attorney

UNITED STATES PATENT OFFICE.

EDWARD E. GOLD, OF NEW YORK, N. Y.

HEATING APPARATUS.

SPECIFICATION forming part of Letters Patent No. 309,299, dated December 16, 1884.

Application filed February 16, 1884. (No model.)

*To all whom it may concern:*

Be it known that I, EDWARD E. GOLD, of the city of New York, N. Y., have invented certain new and useful Improvements in Heating Apparatus, of which the following is a specification.

My invention relates more particularly to that class of steam-heating apparatus in which the heat of steam is applied to an inclosed mass of water or other heat-absorbing material which will act as a reservoir for the heat, so that the said reservoir needs to be charged with heat only at certain intervals, and will continue to give it out slowly for some time afterward. Heaters of this class are particularly well adapted for passenger-cars, as steam requires to be applied to the heaters only at certain intervals, or, say, at the ends of the trips only, at which times the water in the heaters may be raised to a high temperature, and thus charged with a great quantity of heat, which will be gradually radiated during the next trip. In a former patent, issued to me February 14, 1882, No. 253,693, I show a heater of this class consisting of a cylinder of cast-iron, having a partition which divides the cylinder into an upper chamber which is charged with water, and a lower chamber to receive the steam to heat said liquid. Now, my present invention is an important improvement on that type of heater, and in this case I form the heater of two distinct vessels or cylinders, one placed directly within the other, the inner vessel being preferably charged with the liquid, while the outer vessel, which completely incloses it, receives the steam which envelops and heats the liquid, and from which the heat is subsequently radiated through the walls of both vessels. This system has the advantage of being very simple and inexpensive in construction, and may be made of simple wrought pipe and fittings, and is thus at once light and strong and impervious to leakages, and not affected by contractions or expansions, and at the same time possesses great absorbing and radiating qualities; and my invention therefore consists, chiefly, in the features here outlined, as hereinafter fully set forth.

In the drawings annexed, Figure 1 presents a longitudinal elevation of one of my improved heaters. Fig. 2 is a longitudinal section of the same, and Fig. 3 a cross-section thereof. Fig. 4 is a cross-section of a modification. Figs. 5, 6, and 7 are cross-sections of modifications.

Referring to the drawings, $a$ indicates the outer vessel or chamber of the heater, and $b$ the inner vessel, which are distinct inclosures, and which are preferably made of wrought tubing, preferably "boiler-tubes." The ends of the inner tube, $b$, are preferably closed by wrought-iron heads welded therein, and this tube, before it is placed in the outer tube, is charged through a hole in one end with saturated salt-water to about seven-eighths full, leaving a small air-space, as shown, to allow for expansion, and the hole is afterward plugged by the screw-plug $e$, thus hermetically sealing the liquid in the tube. The ends of the outer tube, $a$, are closed after the inner tube is placed therein, preferably by cast-iron heads $d\ d$, screwed thereon, as best shown in Fig. 2, and near the lower edge of said heads screw-holes are formed to connect with steam-pipes, as shown, whereby steam may be admitted to the outer vessel to envelop the inner vessel, as will be understood.

For practical car-heating I prefer to make the outer tube four inches in diameter and the inner tube three inches in diameter, the inner tube being thus about an inch smaller than the outer tube, and also a little shorter in length than the outer tube, so that the inner tube fits within the outer tube without touching the ends, thus leaving free room for expansion. The inner tube is also preferably placed eccentrically in the outer tube, so as to be in contact with each other at the top, the inner tube being supported at the bottom on a piece of iron pipe or rod, $i$, placed between the bottom of the inner and outer pipes, as best shown in Fig. 3. A steam-space is thus formed almost all around the inner pipe, the space being in this case of crescent shape, so that the steam, when admitted to the outer vessel, will envelop the inner pipe, which will thus present almost its entire surface for condensation of the steam and absorption of the heat, which feature forms one point of my invention, without regard to the special construction of the chambers themselves. The result, therefore, will be that when the steam is admitted to the outer tube it will be condensed rapidly on the inner tube, and its heat thus rapidly absorbed by the inner tube and the liquid within it, which in a few minutes will be raised to nearly the temperature of the steam, and in so doing will absorb a vast quantity of heat, which, after the flow of steam is cut off, will be retained for a long time and gradually radiated through the walls of both vessels into the car or other apartment in which the heater may be placed. Hence by this means, when the heaters are used in railway-cars and connected with the engine, steam need only be admitted to the outer tubes at intervals during the run, and the heat will be stored up in the liquid-reservoirs, and thus given out regularly thereafter; or, if the heaters are used in street-cars, the heaters need only be connected for a few minutes with a stationary steam-boiler at one or both ends of the route until the liquid-reservoirs are heated to the desired temperature, when the heat thus absorbed will last during the next trip, as will be readily understood, thus presenting great advantages for such purposes. The tubes of the heater may be made of any desired length, and in case of street-cars but one heater may be used on each side, running the entire length of the car, as the boiler-tubes may be obtained in continuous lengths suited for this purpose, which is one of the prominent constructive advantages of this plan. In some cases, however, the tubes may be cast in short lengths to form short heaters, and a series of these may be placed in successive order and connected together by short steam-pipes $g$, extending from head to head, as will be understood, the outer tubes being properly supported and raised up from the car-floor on chairs $h$, (see Fig. 1,) of the usual character, as will be readily comprehended. It will be seen that the inner tube is entirely distinct from the outer tube, and is simply inclosed in the outer tube and free therein, and both made of wrought pipe; hence the construction is not only very light, simple, and inexpensive, but the two tubes are left entirely free to expand or contract, and hence cannot become strained, warped, or leaky by changes of temperature, as would be likely to occur where tubes are connected rigidly together. Another advantage of having the inner tube of wrought metal is that it is thereby rendered much more impervious to the salt-water than would be the case with cast-iron, and is a better conductor of heat. If desired, however, both tubes may be of cast metal; or the inner tube may be wrought and the outer tube cast.

Instead of having one liquid-tube within the outer steam-tube, the steam-tube might be packed with a series of small liquid-tubes, leaving spaces $s$ between the same, through which the steam would pass, as shown in Fig. 4; or, again, instead of having one round liquid-tube placed eccentrically, the inner tube might be placed centrally, as shown in Fig. 5. Furthermore, instead of having the inner tube round, it may be corrugated, the chests of the corrugations fitting the interior of the outer tube, as shown in Fig. 6.

Referring to Fig. 3, it will be noted that instead of supporting the inner tube on the small pipe or rod, it may be supported on screw-plugs $f$, screwed through the outer tube; or collars may be slipped on the inner tube at numerous points, so as to fit to and rest on the inner tube, as shown in Fig. 7. It is obvious, however, that various other slight modifications may be adopted without departing from the essential features of the plan here shown. The water used in the inner tubes may be charged with any other substance besides salt to prevent freezing; or, if preferred, some other material besides water may be used—for example, acetate of soda, or even sand, may be used; but water is of course obviously preferable, on account of its cheapness and the fact that it absorbs a greater quantity of heat than any other substance.

What I claim is—

1. An improved heater formed of two distinct tubes or vessels, one placed within the other, the inner one being charged with a suitable heat-absorbing material, and the outer being adapted to receive steam or other heating-fluid, substantially as and for the purpose set forth.

2. An improved heater formed of an outer heating-tube provided with connections for admission of steam, in combination with a distinct inner tube charged with a suitable heat-absorbing material, and sealed and placed loosely within the outer tube, inclosed thereby, and free to expand or contract in said inclosing-tube, substantially as herein shown and described.

3. A heater formed of two chambers or vessels, one within the other, the outer one being adapted to receive steam or other heating-fluid, and the inner vessel being sealed and charged with a suitable heat-absorbing material and placed within the outer vessel in such position as to leave a circumferential steam or heating space between the two circumscribing the inner vessel, substantially as and for the purpose set forth.

4. An improved heater formed of an outer steam-tube and an inner tube charged with a suitable heat-absorbing material, placed within the outer tube in an eccentric position, substantially as herein shown and described.

5. The outer tube, $a$, provided with screw-heads $d$ and connections for admission of steam, in combination with the inner sealed tube, $b$, charged with a suitable heat-absorbing material.

6. A heater formed of two wrought-metal pipes, placed one within the other, the end of the outer pipe being closed and adapted to connect with a supply of steam, while the inner pipe is charged with a mass of a suitable heat-absorbing material and sealed and placed loosely in the outer pipe, substantially as herein shown and described.

7. The combination, with the inner sealed pipe, $b$, with welded heads, of the outer pipe, $a$, with its screw-heads $d\ d$ and connections for steam-supply, substantially as and for the purpose set forth.

EDWARD E. GOLD.

Witnesses:
 JNO. E. GAVIN,
 CHAS. M. HIGGINS.